US012404358B2

(12) United States Patent
Pastena et al.

(10) Patent No.: US 12,404,358 B2
(45) Date of Patent: *Sep. 2, 2025

(54) HYDROPHOBIC, LOW GLASS TRANSITION TEMPERATURE OLIGOMER WITH CHAIN TRANSFER AGENT

(71) Applicant: Columbia Insurance Company, Omaha, NE (US)

(72) Inventors: Gianna Pastena, Flanders, NJ (US); Brian Munoz, Union, NJ (US); Hrire Gharapetian, Ridgewood, NJ (US); Thomas Penny, Newton, NJ (US); Ajaya Nanda, Flanders, NJ (US)

(73) Assignee: Columbia Insurance Company, Omaha, NE (US)

( * ) Notice: Subject to any disclaimer, the term of this patent is extended or adjusted under 35 U.S.C. 154(b) by 548 days.

This patent is subject to a terminal disclaimer.

(21) Appl. No.: 17/854,565

(22) Filed: Jun. 30, 2022

(65) Prior Publication Data

US 2022/0340773 A1 Oct. 27, 2022

Related U.S. Application Data

(63) Continuation-in-part of application No. PCT/US2020/063918, filed on Dec. 9, 2020.

(60) Provisional application No. 62/954,906, filed on Dec. 30, 2019.

(51) Int. Cl.
| | |
|---|---|
| *C08F 220/06* | (2006.01) |
| *C08K 3/013* | (2018.01) |
| *C08K 3/04* | (2006.01) |
| *C08K 3/22* | (2006.01) |
| *C08K 3/28* | (2006.01) |
| *C09D 7/65* | (2018.01) |
| *C09D 17/00* | (2006.01) |

(52) U.S. Cl.
CPC ............ *C08F 220/06* (2013.01); *C08K 3/04* (2013.01); *C08K 3/22* (2013.01); *C08K 3/28* (2013.01); *C09D 7/65* (2018.01); *C09D 17/002* (2013.01); *C09D 17/004* (2013.01); *C08K 3/013* (2018.01); *C08K 2003/2265* (2013.01)

(58) Field of Classification Search
CPC .......... C08F 220/06; C08K 3/04; C08K 3/22; C08K 3/28; C08K 3/013; C08K 2003/2265; C09D 7/65; C09D 17/002; C09D 17/004; C09D 17/00
See application file for complete search history.

(56) References Cited

U.S. PATENT DOCUMENTS

| | | | |
|---|---|---|---|
| 4,593,081 A | 6/1986 | Bobsein et al. | |
| 5,095,088 A | 3/1992 | Wang | |
| 5,684,101 A | 11/1997 | Muir et al. | |
| 5,859,112 A | 1/1999 | Overbeck et al. | |
| 5,990,202 A | 11/1999 | Nguyen et al. | |
| 6,391,992 B1 | 5/2002 | Pinschmidt, Jr. et al. | |
| 7,256,226 B2 | 8/2007 | Kuo et al. | |
| 7,402,627 B2 | 7/2008 | Yang et al. | |
| 7,642,314 B2 | 1/2010 | Gharapetian et al. | |
| 7,695,770 B2 | 4/2010 | Dombrowski | |
| 7,750,074 B2 | 7/2010 | Yang et al. | |
| 9,109,068 B2 | 8/2015 | Rodrigues et al. | |
| 9,139,676 B2 | 9/2015 | Yang et al. | |
| 9,815,961 B2 | 11/2017 | Yang et al. | |
| 9,994,722 B2 | 6/2018 | Sheerin et al. | |
| 10,047,232 B2 | 8/2018 | Akkerman et al. | |
| 10,696,850 B2 | 6/2020 | Raghavanpillai et al. | |
| 2004/0003908 A1 | 1/2004 | Singh et al. | |
| 2004/0019141 A1 | 1/2004 | Bastelberger et al. | |
| 2014/0235752 A1* | 8/2014 | Gharapetian | C09D 133/12 523/201 |
| 2015/0000554 A1 | 1/2015 | Nabuurs et al. | |
| 2015/0353666 A1* | 12/2015 | Chuang | A61K 8/046 526/264 |
| 2016/0333199 A1 | 11/2016 | Ankerman et al. | |
| 2018/0118956 A1 | 5/2018 | Raghavanpillai et al. | |
| 2020/0299433 A1 | 9/2020 | Chen et al. | |

OTHER PUBLICATIONS

European Office Action issued in connection with the corresponding European Patent Application No. 20 854 605.6 on Jan. 27, 2023.
International Search Report and Written Opinion issued in connection with the corresponding International Application No. PCT/US2020/063918 on Mar. 17, 2021.
Ludmila I. Ronco et al. "Emulsion Polymerisation of MMA Employing a Chain Transfer Agent of Low Environmental Impact: ISO-OCTYL-3-Mercaptopropionate." The Canadian Journal of Chemical Engineering. col. 91, Apr. 2013.

* cited by examiner

*Primary Examiner* — Peter F Godenschwager
*Assistant Examiner* — Zhen Liu
(74) *Attorney, Agent, or Firm* — The H.T. Than Law Group

(57) ABSTRACT

Disclosed herein is an additive for a paint or stain composition or for a colorant composition. The additive is polymerized from at least one acrylate monomer and a chain transfer agent. The additive has a weight molecular weight from about 2,000 Daltons to about 5,000 Daltons, and the chain transfer agent comprises a hydrogen-sulfur functionality. The additive's glass transition temperature ranges from about −50° C. to about −10° C. and the additive is hydrophobic.

26 Claims, No Drawings

HYDROPHOBIC, LOW GLASS TRANSITION TEMPERATURE OLIGOMER WITH CHAIN TRANSFER AGENT

CROSS-REFERENCE TO RELATED PATENT APPLICATIONS

The present patent application is a continuation-in-part under 35 U.S.C. § 120 to international patent application No. PCT/US2020/063918 filed on 9 Dec. 2020, which claims priority under 35 U.S.C. 119(e) to U.S. provisional patent application No. 62/954,906, which was filed on 30 Dec. 2019. The parent patent applications are incorporated by reference in their entireties.

FIELD OF THE INVENTION

The present invention is directed to hydrophobic oligomers that when added to colorant compositions can reduce the incidents of clogging at the colorant canisters' tip. The present invention is also directed to hydrophobic oligomers that can be added to paint and stain compositions as an open time additive and do not adversely affect the qualities of the paint or stain films.

BACKGROUND OF THE INVENTION

Most of the tintable base paints manufactured at the factories are shipped to the paint stores without colorants. When consumers purchase the paints and select the paint colors, multiple colorant compositions, known as the color primaries, are added to and mixed with the tintable paints to achieve the final paint colors. Commonly owned U.S. Pat. No. 9,994,722 to Sheerin et al describes the process of tinting or coloring the tintable base paints with colorant compositions at the points-of-sale and is incorporated herein by reference in its entirety. Many tintable base paints contain opacifying pigments, except for the deep or 4-base tintable paints which has little or no opacifying pigment, as discussed in Sheerin et al. Commonly owned U.S. Pat. Nos. 7,402,627, 7,750,074, 9,139,676 and 9,815,961 to Yang et al describe high-end water-based colorants and are incorporated herein by reference in their entireties.

The colorant compositions are typically stored in canisters ready to be dispensed into the tintable based paints. One drawback of maintaining colorant canisters is having to regularly clean the dispensing tips of the canisters, since colorants may dry and partially or fully block the canister tips. Fully blocked canister tips prevent the dispensing of the colorants, and partially blocked canister tips would prevent the dispensing of the correct amounts of individual colorants to mix the correct paint colors.

A conventional solution is to add a humectant, e.g., a hydrophilic additive, such as polyethylene glycol, such as PEG400, to the colorant to maintain the fluidity of the colorant compositions within the colorant canisters. While retaining moisture, such hydrophilic additives can cause water sensitivity of the dry paint films thereby causing undesirable surfactant leaching, which leaves unsightly albeit washable streaks on paint films.

Hence, there remains a need to maintain the tips of the colorant canisters open to allow unobstructed dispensing of colorants without negatively affecting the properties of the paint films.

SUMMARY OF THE INVENTION

An embodiment of the present invention is directed to a novel humectant and unlike the conventional humectants, the inventive humectant is hydrophobic and are preferably oligomers or low molecular weight polymers. Preferably, the inventive humectant also has a low glass transition temperature (Tg), such that the inventive humectant remains in a liquid or viscous phase within the temperature ranges relevant for the application of paints and stains to walls or floors and for dry paint and stain films. More preferably, the inventive humectant also has an optimal range of viscosities or flow viscosities to assist with the colorants' flow through the dispensers.

In another embodiment, the inventive humectant utilizes a relatively high amount of chain transfer agent to maintain low molecular weight. In another embodiment, the amount of chain transfer agent used is significantly higher than the levels heretofore used or experimented in polymerization to control molecular weights. Suitable chain transfer agents include but are not limited to monofunctional mercaptans such as monothiols or compounds having a sulfur-hydrogen (S—H) functionality, such as the preferred isooctyl 3-mercaptopropionate (iOMP) and n-dodecyl mercaptan (n-DDM), among others described below.

An embodiment of the present invention relates to an additive for a paint or stain composition or for a colorant composition. The additive is polymerized from at least one acrylate monomer and a chain transfer agent. The additive preferably has a weight average molecular weight (Mw) from about 2,000 Daltons to about 5,000 Daltons, preferably from about 2,500 Daltons to about 4,000 Daltons. The chain transfer agent preferably comprises a hydrogen-sulfur (H—S) functionality and is present from about 8 to about 20 parts per hundred parts of monomers (phr), preferably from about 9 to about 17 phr, more preferably from about 9.5 to about 15 phr. The additive's glass transition temperature ranges from about −50° C. to about −10° C., preferably from about −40° C. to about −20° C. The additive is hydrophobic. This additive is preferably added to a colorant composition. The colorant composition comprises a color pigment and an optional opacifying pigment.

In one embodiment, the additive comprises from about 3 wt. % to about 8 wt. % of the colorant composition. Alternatively, the additive comprises from about 3.5 wt. % to about 7 wt. %, or from about 4.0 wt. % to about 6 wt. %, or from about 3 wt. % to about 5 wt. % of the colorant composition. In the determination of the weight percentages, the additive and the colorant composition includes solids, water and liquids.

In another embodiment, a hydrophilic humectant is also added to the colorant composition, and the additive comprises from about 0.1 wt. % to about 4 wt. % of the colorant composition. Alternatively, the additive comprises from about 0.2 wt. % to about 3 wt. % or from about 0.3 wt. % to about 2.5 wt. % of the colorant composition. In the determination of the weight percentages, the additive and the colorant composition includes solids, water and liquids.

Preferably, said at least one acrylate monomer comprises a principal acrylate monomer, and the principal acrylate monomer comprises at least 50 wt. % of all monomers, preferably at least 60 wt. %, preferably at least 70 wt. %, preferably at least 75 wt. %, and the at least one acrylate monomer preferably has a solubility in water of less than 5 g/l, preferably less than 4 g/l or preferably less than 3 g/l at 20° C. to 30° C. In one example, the principal monomer is butyl acrylate (BA). In another example, the principal monomer is 2-ethylhexyl acrylate (2-EHA). In another example, the at least one acrylate monomer comprises at least both BA and 2-EHA.

Another embodiment of the present invention is directed to additive for a paint or stain composition or for a colorant composition, which is polymerized from at least one acrylate monomer and a chain transfer agent. The additive has a weight average molecular weight (Mw) from about 2,000 Daltons to about 5,000 Daltons. The chain transfer agent comprises a hydrogen-sulfur (H—S) functionality and is present from about 4 to about 20 parts per hundred parts of monomers (phr). The additive's glass transition temperature ranges from about −50° C. to about −10° C., and the additive is hydrophobic. The additive has a viscosity from about 1.0 Pa·s to about 20 Pa·s, when the viscosity values are averaged at the same sheer rate, or the viscosity is from about 14 Pa·s to about 36 Pa·s, when the viscosity values are averaged at various different sheer rates.

The additive can be polymerized from at least 95 wt. % acrylate monomer or monomers or from all acrylate monomers. The at least one acrylate monomer is preferably butyl acrylate (BA) or 2-ethylhexyl acrylate (2-EHA).

In a preferred variation, the additive is polymerized with an acrylic acid monomer.

In another embodiment, the additive is added to a colorant composition, which has a color pigment and an optional opacifying pigment. The additive is added to the colorant composition in a range from about 3 wt. % to about 8 wt. %, preferably from about 3.5 wt. % to about 7 wt. %, preferably from about 4 wt. % to about 6 wt. %, preferably from about 3 wt. % to about 5 wt. %. In a variation, the color composition comprises a hydrophilic humectant, a pigment and the inventive additive. The additive is added to the colorant composition in a range from about 0.1 wt. % to about 4 wt. %, preferably from about 0.2 wt. % to about 3 wt. %, preferably from about 0.3 wt. % to about 2.5 wt. %. In the determination of the weight percentages, the additive and the colorant composition includes solids, water and liquids.

The chain transfer agent can be present from about 6 phr to about 17 phr, or from about 9 phr to about 15 phr or from about 5 phr to about 11 phr.

The viscosity of the additive can be from about 3.0 Pa·s to about 16 Pa·s, or from about 5 Pa·s to about 12 Pa·s, when the viscosity values are averaged at the same sheer rate. The viscosity can be from about 15 Pa·s to about 20 Pa·s, when the viscosity values are averaged at various different sheer rates.

Alternatively, the additive can be added directly to a paint or stain composition. The paint or stain composition further comprises a film forming resin and an optional opacifying pigment. As used herein, the opacifying pigment functions to hide the surface covered by the paint or stain composition and includes titanium dioxide. As used herein, the opacifying pigment is different than color pigments which tint or color tintable paint or stain compositions. Titanium dioxide pigment may also be utilized in colorant compositions to impart whiteness.

These and other objects of the present invention are realized by the claims below, and various embodiments and aspects of the present invention are described in the Detailed Description and by the claims below.

DETAILED DESCRIPTION OF THE PREFERRED EMBODIMENTS

In accordance with an aspect of the present invention, the present inventors have discovered a hydrophobic oligomer made with a high amount of chain transfer agent from about 8 to about 20 phr of the total monomer weight (parts per hundred parts of monomer/rubber) of a chain transfer agent, preferably iOMP or n-DDM, a Tg of lower than about −10° C. and higher than about −50° C., such that the hydrophobic oligomer remains in the liquid or viscous phase within the relevant temperature ranges for paints and stains. The weight average molecular weight (Mw) of the inventive oligomer is preferably from about 2,000 Daltons to about 5,000 Daltons.

Preferably, the amount of chain transfer agent can range from about 9 to about 17 phr and preferably from about 9.5 to about 15 phr. Preferably, the weight molecular weight of the inventive hydrophobic oligomer may range from about 2,500 Daltons to about 4,000 Daltons. Preferably, the Tg of the inventive hydrophobic oligomer may range from about −50° C. to about −10° C. or preferably from about −40° C. to about −20° C. Preferably, the hydrophobicity of the inventive oligomer is illustrated by the monomers' solubility in water, as discussed below.

The inventive hydrophobic oligomer is preferably polymerized and more preferably polymerized by emulsion polymerization, from principally acrylic monomers and more preferably from at least one "principal acrylic monomer," such as butyl acrylate monomers (BA) or 2-ethylhexyl acrylate (2-EHA), that also have low solubility in water to ensure the oligomer's hydrophobicity. As used herein, a principal acrylic monomer makes up at least about 50 wt. % of the total monomer, preferably at least about 60 wt. %, or at least about 70 wt. % or at least about 75 wt. %.

Other suitable low Tg and low solubility acrylic monomers include but are not limited to 2-ethoxyethyl acrylate (Tg=−50° C.), 2-methoxyethyl acrylate (Tg=−50° C.) and octadecyl methacrylate (Tg=−100 C; sol. 1 μg/l @ 25 C).

So long as the resulting oligomers are hydrophobic and has Tgs within the stated range, "other acrylic monomers" and "other monomers" may also be included in the inventive hydrophobic oligomer. Suitable other acrylic monomers may include methyl methacrylate (MMA) and methacrylic acid (MAA). Suitable other monomers may include vinyl or styrene. Latexes made principally from acrylic monomers are preferred for the present invention, although the inclusion of other non-acrylic monomers are within the scope of the present invention.

Any acrylic monomers can be used as the other acrylic monomers. Any (meth)acrylic monomers can be used in the present invention. Suitable (meth)acrylic monomers include, but are not limited to methyl (meth)acrylate, ethyl (meth) acrylate, butyl (meth)acrylate, iso-octyl (meth)acrylate, lauryl (meth)acrylate, 2-ethylhexyl (meth)acrylate, stearyl (meth)acrylate, isobornyl (meth)acrylate, methoxyethyl (meth)acrylate, 2-ethyoxyethyl (meth)acrylate, 2-hydroxyethyl (meth)acrylate, 2-hydroxybutyl (meth)acrylate, dimethylamino ethyl (meth)acrylate, diethylaminoethyl (meth) acrylate, dimethylaminopropyl (meth)acrylamide, alkyl (meth)acrylic acids, such as methyl (meth)acrylate acids, (meth)acrylic acids, wet adhesion monomers, such as N-(2-methacryloyloxyethyl)ethylene urea, and multifunctional monomers such as divinyl benzene, diacrylates, for crosslinking functions etc., acrylic acids, ionic acrylate salts, alkacrylic acids, ionic alkacrylate salts, haloacrylic acids, ionic haloacrylate salts, acrylamides, alkacrylamides, monoalkyl acrylamides, monoalkyl alkacrylamides, alkyl acrylates, alkyl alkacrylates, acrylonitrile, alkacrylonitriles, dialkyl acrylamides, dialkyl alkacrylamides, hydroxyalkyl acrylates, hydroxyalkyl alkacrylates, only partially esterified acrylate esters of alkylene glycols, only partially esterified acrylate esters of non-polymeric polyhydroxy compounds like glycerol, only partially esterified acrylate esters of polymeric polyhydroxy compounds, itaconic acid, itaconic mono and di-esters, and combinations thereof. The preferred alkyl (meth)acrylate monomers are methyl methacrylate and butyl acrylate.

Preferred other monomers or other non-acrylic monomers include monomers containing aromatic groups, such as styrene and α-methylstyrene. Other suitable monomers containing aromatic groups include, but are not limited to, 2,4-diphenyl-4-methyl-1-pentene, 2,4-dimethylstyrene, 2,4,6-trimethylstyrene, 2,3,4,5,6-pentafluorostyrene, (vinylbenzyl)trimethylammonium chloride, 2,6-dichlorostyrene, 2-fluorostyrene, 2-isopropenylaniline, 3(trifluoromethyl)styrene, 3-fluorostyrene, α-methylstyrene, 3-vinylbenzoic acid, 4-vinylbenzyl chloride, α-bromostyrene, 9-vinylanthracene, and combinations thereof.

Preferred other monomers containing primary amide groups are (meth)acrylamides. Suitable monomers containing amide groups include, but are not limited to, N-vinylformamide, or any vinyl amide, N,N-dimethyl(meth)acrylamide, N-(1,1-dimethyl-3-oxobutyl)(meth)acrylamide, N-(hydroxymethyl)(meth)acrylamide, N-(3-methoxypropyl)(meth)acrylamide, N-(butoxymethyl)(meth)acrylamide, N-(isobutoxymethyl)acryl(meth)acrylamide, N-[tris(hydroxymethyl)methyl]acryl(meth)acrylamide, 7-[4-(trifluoromethyl)coumarin]meth)acrylamide, 3-(3-fluorophenyl)-2-propenamide, 3-(4-methylphenyl)(meth)acrylamide, N-(tert-butyl)(meth)acrylamide, and combinations thereof. These monomers can be polymerized with acrylic monomers, listed above. General formula for vinyl(form)amides are:

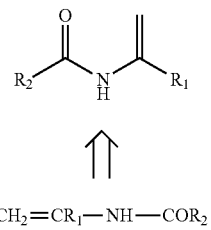

and (meth)acrylamides:

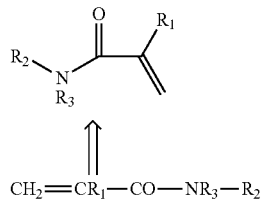

where $R_1$ and $R_2$ can be —H, —$CH_3$, —$CH_2CH_3$, and other substituted organic functional groups and $R_3$ can be —H, an alkyl or an aryl.

In one embodiment, the other monomers may also include vinyl monomers. Monomers of this type suitable for use in accordance with the present invention include any compounds having vinyl functionality, i.e., —CH=$CH_2$ group. Preferably, the vinyl monomers are selected from the group consisting of vinyl esters, vinyl aromatic hydrocarbons, vinyl aliphatic hydrocarbons, vinyl alkyl ethers and mixtures thereof.

Suitable vinyl monomers include vinyl esters, such as, for example, vinyl acetate (VA), vinyl propionate, vinyl laurate, vinyl pivalate, vinyl nonanoate, vinyl decanoate, vinyl neodecanoate, vinyl butyrates, vinyl caproate, vinyl benzoates, vinyl isopropyl acetates and similar vinyl esters; nitrile monomers, such (meth)acrylonitrile and the like; vinyl aromatic hydrocarbons, such as, for example, styrene, methyl styrenes and similar lower alkyl styrenes, chlorostyrene, vinyl toluene, vinyl naphthalene and divinyl benzene; vinyl aliphatic hydrocarbon monomers, such as, for example, vinyl chloride and vinylidene chloride as well as alpha olefins such as, for example, ethylene, propylene, isobutylene, as well as conjugated dienes such as 1,3-butadiene, methyl-2-butadiene, 1,3-piperylene, 2,3-dimethyl butadiene, isoprene, cyclohexene, cyclopentadiene, and dicyclopentadiene; and vinyl alkyl ethers, such as, for example, methyl vinyl ether, isopropyl vinyl ether, n-butyl vinyl ether, and isobutyl vinyl ether.

A polymerizable glycol, such as methoxy polyethylene glycol (MPEG) or polypropylene glycol methyl ether may also be polymerized with the other monomers. A preferred polymerizable glycol is MPEG 750, which has 17 units of ethylene oxide (EO) side chains. MPEG with different EO chain lengths can also be used, MPEG 250, MPEG 350, MPEG 500, MPEG 1000, MPEG 3000, etc. The glycol is polymerized to prevent the hydrophilic PEG compound from leaching out of the paint film, e.g., when the film is wetted.

Suitable chain transfer agents include but are not limited to monofunctional mercaptans such as monothiols or compounds having a sulfur-hydrogen (S—H) functionality. A preferred chain transfer agent is isooctyl 3-mercaptopropionate (iOMP), disclosed in commonly owned U.S. Pat. No. 7,642,314 to Gharapetian et al. The preferred iOMP ($C_{11}H_{22}O_2S$) chain transfer agent has the following structure:

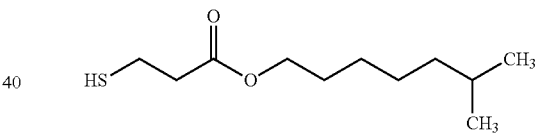

Other suitable mercaptan chain transfer agents include but are not limited to n-dodecyl mercaptan (n-DDM), t-dodecyl mercaptan, n-octyl mercaptan, t-octyl mercaptan, sec-octyl mercaptan, n-tetradecyl mercaptan, n-octadecyl mercaptan, n-hexyl mercaptan, n-amyl mercaptan, n-butyl mercaptan, t-butyl mercaptan, n-butyl 3-mercaptopropionate (BMP), methyl 3-mercaptopropionate, and the like, as well as mixtures thereof, disclosed in U.S. Pat. Nos. 4,593,081 and 7,256,226. The '081 patent further discloses other non-mercaptan chain transfer agents. All patent references cited in this paragraph are incorporated herein by reference in their entireties. n-DDM is another preferred chain transfer agent.

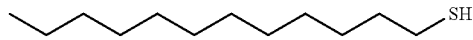

Additives including surfactants, initiators, chaser solutions, biocides, rheological modifiers, etc., can be added to the polymerization process.

Examples of surfactants useful in the polymerization process may include, but are not limited to, nonionic and/or anionic surfactants such as ammonium nonoxynol-4 sulfate, nonylphenol (10) ethoxylate, nonylphenol (~10 mol %) ethoxylate, nonylphenol (~40 mol %) ethoxylate, octylphenol (~40 mol %) ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, those compounds sold under the tradename Triton™ (e.g., QS series, CF series, X series, and the like), those compounds sold under the tradename Rhodapon™, those sold under the tradename Rhodapex™, those compounds sold under the tradename Rhodacal™, those compounds sold under the tradename Rhodafac™, and the like, and combinations thereof.

Examples of initiators and chaser solutions useful in the polymerization process may include, but are not limited to, ammonium persulfate, sodium persulfate (SPS), azo initiators such as azoisobutyronitrile, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjuster, if desired to stabilize the emulsion.

Examples of pH adjusters useful in the polymerization process may include, but are not limited to, ammonium hydroxide, sodium hydroxide, sodium carbonate, sodium bicarbonate, potassium hydroxide, potassium carbonate, potassium bicarbonate, ammonia, amines such as trimethylamine, triethylamine, dimethylaminoethanol, diethylaminoethanol, AMP-95 and the like, and combinations thereof. In certain cases, compounds that qualify as pH adjusters can be added for purposes other than adjusting pH, e.g., emulsion stabilization, and yet are still characterized herein as pH adjusters.

Preferably, the latex emulsion polymers are chased with a redox (reducing agent and oxidation agent) pair to reduce the odor and to neutralize the unreacted monomers without performing the lengthy or time-consuming stripping step and requiring additional stripping equipment.

Suitable oxidizing agents include but are not limited to water-soluble hydroperoxides, tertiary butyl hydroperoxide, cumene hydroperoxide, hydrogen peroxide, sodium peroxide, potassium peroxide, sodium perborate, potassium persulfate, sodium persulfate, ammonium persulfate, persulfuric acid and salts thereof, perphosphoric acid and salts thereof, potassium permanganate, and an ammonium or alkali salt of peroxydisulfuric acid. A preferred oxidizing agent is tertiary butyl hydroperoxide (tBHP).

Suitable reducing agents include but are not limited to sodium formaldehyde sulfoxylate (SFS), ascorbic acid, isoascorbic acid, organic compounds containing thiol or disulfide groups, reducing inorganic alkali and ammonium salts of sulfur-containing acids, such as sodium sulfite, disulfite, thiosulfate, hydrosulfite, sulfide, hydrosulfide or dithionite, formadinesulfinic acid, hydroxymethanesulfonic acid, acetone bisulfite, amines, such as ethanolamine, glycolic acid, glyoxylic acid hydrate, lactic acid, glyceric acid, malic acid and tartaric acid. A preferred reducing agent is a formaldehyde-free SFS.

The following non-limiting Example 1 illustrates an emulsion polymerization of the inventive hydrophobic oligomer humectant. A monomer pre-emulsion was prepared, while the deionized water (DI) in a reactor was heated to 80° C. 36 grams of seed and a first initiator were charged to the reactor at 80° C., and held for 15 minutes. The monomer pre-emulsion feed was added to the reactor and then the second or delay initiator was added to the reactor over 3 hours, then held 30 minutes. The content of the reactor was cooled to 55° C., and then chased over 30 minutes. Thereafter, the content of the reactor was cooled to 35° C., before a pH adjustor (ammonia) and biocide were added. In this Example 1, the latex particles have a calculated Tg of −27° C.

The aggregated Tg of a co-polymer calculated by Fox's equation includes the individual Tg of various monomers being co-polymerized, as follows:

$$1/Tg_{agg} = Wf_1/Tg_1 + Wf_2/Tg_2 + Wf_x/Tg_x,$$

where $Tg_{agg}$ is the aggregated Tg of the co-polymer,
$Wf_x$ is the weight fraction of each monomer x,
$Tg_x$ is the Tg of a polymer made from the single monomer x, and
x is the number of monomers in the co-polymer.

Tgs can also be measured by the differential scanning calorimetry (DSC) technique. Unless noted otherwise, Tgs used herein are calculated by Fox's Equation; all percentages are based on weight or wt. %; and all molecular weights are weight average molecular weights (Mw).

Example 1

|  | total (g) | % solids | Amt. solids |  |
|---|---|---|---|---|
| DI | 818 | 0% | 0 |  |
| First initiator: | | | | |
| SPS | 2.0 | 100% | 2 |  |
| DI | 40 | 0% | 0 |  |
| Monomer pre-emulsion: | | | | |
| DI | 300 | 0% | 0 |  |
| Surfactant | 33.8 | 25% | 8.45 |  |
| MMA | 79.2 | 100% | 79.2 | 15.0% |
| BA | 422.4 | 100% | 422.4 | 80.0% |
| MAA | 26.4 | 100% | 26.4 | 5.0% |
| IOMP | 73.2 | 100% | 73.2 | 14 phr |
| Monomer delay initiator: | | | | |
| SPS | 2.0 | 100% | 2 |  |
| DI | 30 | 0% | 0 |  |
| DI rinse | 100 | 0% | 0 |  |
| Chasers: | | | | |
| tBH | 1.5 | 100% | 1.5 |  |
| DI | 18 | 0% | 0 |  |
| FF SFS | 1.5 | 100% | 1.5 |  |
| DI | 18 | 0% | 0 |  |
| Post-adds | | | | |
| NH$_3$ | 19.0 | 28% | 5.32 |  |
| DI | 20 | 0% | 0 |  |
| Acticide | 3.8 | 100% | 3.8 |  |
| DI | 3.8 | 0% | 0 |  |
| Total Latex: | | | | |
| total (g) |  |  | 2013.00 |  |
| total (g) solids |  |  | 625.77 |  |
| % solids = |  |  | 31.09% |  |
| % surfactant = |  |  | 1.60% |  |
| total active monomer (g) = |  |  | 528.00 |  |

The total monomer weight was 528 grams. Hence, the 73.2 grams iOMP was about 14 phr (73.2÷528) (parts per hundred parts of monomers/rubber).

Several other Examples of the inventive hydrophobic oligomers were prepared using the emulsion polymerization technique of Example 1. The results are summarized below.

| Example | Mw (Daltons) | Viscosity (Pa · s) | Tg (° C.) | CTA (iOMP) (phr) | Monomers |
|---|---|---|---|---|---|
| 2 | 3477 | 36.00 | −27 | 10 | BA 80% MMA 15% MAA 5% |
| 3 | 3434 | 28.23 | −30 | 10 | BA 82.6% MMA 10.3% MAA 5.2% MPEG 1.9% |
| 4 | 2650 | 15.88 | −27 | 14 | BA 80% MMA 15% MAA 5% |
| 5 | 3638 | 19.47 | −30 | 10 | BA 83.0% MMA 14% MAA 1.5% MPEG 1.5% |
| 6 | 3790 | 21.98 | −27 | 10 | BA 80% MMA 18.5% MAA 1.5% |

As shown in Examples 1-6, higher levels of chain transfer agent, e.g., 14 phr, resulted in lower molecular weight, as expected, and lower viscosity. Due to the low glass transition temperatures, the hydrophobic oligomers are in the liquid or viscous stage at room temperature and for the relevant temperature ranges for indoor and outdoor aqueous paint compositions and for dry paint films, e.g., from about 10° C. (50° F.) to about 50° C. (122° F.). Their viscosities are measured and reported. Hence, the present inventors believe that the hydrophobic oligomers are non-film forming, and that in a paint film the hydrophobic oligomers associate with the latex particles through hydrophobic interactions. The inventive hydrophobic oligomers are compatible with the pigments and other particles in the colorant compositions.

Examples 1-4 contains higher amounts of MAA monomer, which is hydrophilic, as compared to Example 6, which contains a typical amount of MAA. Examples 3 and 5 also contain a small amount of hydrophilic MPEG monomer. Without being bound to any particular theory, the present inventors believe that some hydrophilicity was needed for better stabilization and association in the colorant compositions and in paint compositions. The oligomer latexes were still successful as an anti-tip drying additive, because the overall oligomers are still substantially hydrophobic and fluid, and can be used in colorant formulations in place of humectants due to its fluidic properties. Oligomers with lower hydrophilic monomers are preferred due to better resistance to surfactant leaching. Also, Examples 1 and 4 have similar monomer contents and Example 4 utilized more initiator. Also, without being bound to any particular theory, the present inventors believe that hydrophobic soft polymers or oligomers (with low Tg) provide the possibility of making soft and fluid polymers or oligomers and the ability to keep the oligomers fluid in the absence of water.

The monomer and chain transfer agent contents of Example 1, i.e., 14 phr, and with 80% BA, 15% MMA and 5% MAA, were repeated, as shown below. Examples 4, 7, 8, 9 and 10 utilized the same formulation, except that Examples 9 and 10 used less initiator, similar to Example 1. The viscosity of Example 1 is similar to those of Examples 9 and 10. As shown below, there were no significant difference in molecular weight or viscosity and there were no significant differences in anti-tip drying performance. Hence, preferably lower amounts of initiator are preferred.

| Example | Mw (Daltons) | Viscosity (Pa · s) |
|---|---|---|
| 4 | 2650 | 15.88 |
| 7 | 2422 | 15.66 |
| 8 | 2465 | 15.73 |
| 9 | 2641 | 16.43 |
| 10 | 2654 | 15.86 |

The examples with 14 phr of iOMP have substantially similar properties and the results are repeatable, as well as the examples with 10 phr of iOMP. The inventive examples with 14 phr of iOMP have significantly lower Mw than those with 10 phr. Due to their similar monomer composition, viscosity and molecular weight, Examples 1, 4 and 7-10 are considered as one group during performance testing. The molecular weight and viscosity results suggest that the effect of high-level chain transfer agent IOMP on the molecular weights of the oligomers may dominate the effect of changes in initiator concentration.

In Example 11, a higher amount of CTA, e.g., 20 phr, was included in the polymerization of monomers to show that higher CTA content is feasible and brings the molecular weight of the oligomer even lower. Example 12 has 14 phr of CTA and is a comparison for Example 11 for measuring molecular weight, as discussed below. The monomers that were polymerized include 80 wt. % BA, 15 wt. % MMA and 5 wt. % MAA. The CTA was iOMP.

| Example | CTA | Mw (Daltons) |
|---|---|---|
| 11 | 20 phr | 2,081 |
| 12 | 14 phr | 2,982 |

The molecular weight of Example 11 at the higher CTA is within the preferred range of molecular weights of the inventive oligomer, stated above.

The molecular weights, which are weight average molecular weights, of the inventive hydrophobic oligomer were determined by a water's GPC instrument, equipped with refractive index and UV detectors using THF mobile phase. The viscosities were measured on dried samples of the examples after the water had evaporated leaving behind a substantially clear or transparent fluid at room temperature. Viscosities of Examples 1-10 were measured with an Anton Paar Modular Compact Rheometer model MCR 302, which measured the viscosity as an average value of measurements at various different sheer rates.

As utilized herein, solubility is an indication of the degree of hydrophilicity and hydrophobicity. Lower solubility indicates more hydrophobicity and higher solubility indicates more hydrophilicity. It is known that BA, EA and dodecyl methacrylate have low Tg and are hydrophobic. See "Mechanical Properties of Hydrophilic Copolymers of 2-Hydroxyethyl Methacrylate with Ethyl Acrylate, N-Butyl Acrylate, and Dodecyl Methacrylate," J Biomed Mater Res. 1983 September; 17(5):757-67 (available at www.ncbi.nlm-.nih.gov/pubmed/6619175.)

While it is preferred that the principal acrylic monomer, e.g., BA or 2-EHA, should have low solubility, preferably less than about 5 g/l from 20° C. to 30° C., more preferably less than about 4 g/l, or less than about 3 g/l. There does not appear to be a consensus in the scientific literature of a temperature at which to measure solubility. Hence, the present invention takes into account the reported solubility values, which are summarized below along with calculated Tg values. It is noted that the resulting oligomer is preferably hydrophobic, more so than any one monomer.

| Monomer | Solubility in Water at T° | Tg (° C.) |
|---|---|---|
| BA | 2 g/l at 23° C. | −54 |
| 2-EHA | 0.0096 g/l at 25° C. | −50 |
| EA | 15-20 g/l at 25° C. | −24 |
| MMA | 15 g/l at 30° C. | 105 |
| MAA | 89 g/l at 20° C. | 228 |
| Styrene | 0.3 g/l at 25° C. | 100 |
| VA | 20 g/l at 25° C. | 30 |
| iOMP | <0.00767 g/l at 20° C. | n/a |
| DMA | 1 μg/l at 25° C. | −65 |

(DMA is dodecyl methacrylate, also known as lauryl methacrylate, preferably long chain ($C_{12}$ and $C_{13}$), and AA is acrylic acid.) Solubility information was obtained from https://www.ncbi.nlm.nih.gov/pccompound and https://echa.europa.eu/. Tg information was obtained from https://www3.nd.edu/~hgao/thermal_transitions_of_homopolymers.pdf, or from http://www.wernerblank.com/equat/Fox_equation15.htm. The freezing point of iOMP is about −10° C. (see https://www.chemicalbook.com/ProductChemicalPropertiesCB2757359_EN.htm).

A set of experiments was conducted with aqueous colorant compositions described in commonly owned U.S. Pat. Nos. 7,402,627, 7,750,074, 9,139,676 and 9,815,961 to Yang et al mentioned above. The experiments were conducted with inorganic colorants, e.g., red oxide colorant, and organic colorants, e.g., carbon black colorant and phthalocyanine blue. These colorant compositions have polyethylene glycol (PEG) added thereto as a hydrophilic humectant. PEG is a liquid at the relevant temperature ranges and is highly soluble in water (256 g/l at 25° C.). PEG is substituted with the inventive hydrophobic humectants from Examples 2-6 at a weight ratio of 1:1. Red oxide, carbon black and phthalocyanine blue colorant compositions were tested. About 20 wt. % of the inventive hydrophobic oligomer was added to the red oxide and phthalocyanine blue colorant compositions, and about 10 wt. % was added to the carbon black colorant composition. The inventive hydrophobic oligomer can be added from about 6 wt. % to about 30 wt. % of the colorant composition in these experiments, preferably from about 8 wt. % to about 27.5 wt. % or from about 9 wt. % to about 25 wt. %.

As used herein, colorant compositions are not paint or stain compositions. Colorant compositions are mixed into tintable paint or stain compositions at the points of sale to tint the paints and stains. Colorant compositions may comprise a small amount of binder and this binder is insufficient to form a film or a matrix that encapsulates the pigments contained in the colorant compositions. Colorant compositions contain color pigments and may also contain opacifying pigments, such as titanium dioxide, to impart whiteness.

Tip Drying Experiment. The inventive hydrophobic oligomer was evaluated for this effectiveness as an anti-tip drying agent. The tips of pipettes having a volume of 7 ml was cut to a diameter of about 3 mm to simulate the tips of colorant canisters on a tinting machine. Colorant compositions were loaded into these pipettes, and the pipettes were left undisturbed for a predetermined time period, i.e., 16 hours in this experiment. After the predetermined time period has passed, colorant samples were dispensed from the cut-end of the pipette. A rating system was designed to quantify the anti-tip drying effectiveness, as follows:

| Rating | Description |
|---|---|
| 0 | Fail-completely blocked |
| 1 | Maximum pressure |
| 2 | High pressure |
| 3 | Some pressure |
| 4 | Minimum pressure |
| 5 | No blocking |

Ratings from 1-4 may include some angular dispensing.

| Red oxide inorganic colorant composition - pipette tip experiments | | | | | | |
|---|---|---|---|---|---|---|
|  | conventional | Ex. 2 | Ex. 3 | Ex. 4 | Ex. 5 | Ex. 6 |
| Trial 1 | 3 | 5 | 2 | 5 | 5 | 5 |
| Trial 2 | 3 | 2 | 5 | 5 | 5 | 5 |
| Avg. | 3 | 3.5 | 3.5 | 5 | 5 | 5 |

The results show that the inventive hydrophobic oligomer performs consistently better than the conventional PEG hydrophilic humectant in anti-tip drying effectiveness.

Colorant Drying Experiment. Another experiment was conducted to test the drying characteristics of the colorant compositions on a substrate. 10-mil (10 thousandth of 1 inch) drawdowns of the colorant compositions were made on white scrub cards. At different time intervals, a line of sand was applied across the film. This process was continued until the colorant compositions dried and the sand no longer adhered to the colorants.

| Red oxide inorganic colorant composition - sand trial experiments | | | | | | |
|---|---|---|---|---|---|---|
|  | conventional | Ex. 2 | Ex. 3 | Ex. 4 | Ex. 5 | Ex. 6 |
| Trial 1 | 66 min. | 75 min. | 75 min. | 76 min. | 76 min. | 72 min. |

The results show that the inventive hydrophobic oligomer humectant performed better than the PEG hydrophilic humectant by significant amount of time for the red oxide inorganic colorant.

| Carbon black organic composition - sand trail experiments | | |
|---|---|---|
|  | conventional | Ex. 2 |
| Trial 1 | 81 min. | 78 min. |

| Phthalocyanine blue organic composition sand trial experiments | | |
|---|---|---|
|  | PEG | Example 2 | Example 4 |
| Trial 1 | 55 min | 60 min | 60 min |

The results show that the inventive hydrophobic oligomer humectant when used with organic colorants performs comparable to the PEG hydrophilic humectant. The present inventors believe that the relative low amount of the inventive hydrophobic oligomer used (10 wt. % at 10 phr) did not sufficiently improve the open time over the conventional hydrophilic PEG, and that carbon black organic colorant have smaller pigment particles resulting in lower total solids in the colorant and requiring less humectant. On the other hand, red oxide inorganic colorant has larger pigment particles resulting in higher total solids in the colorant and requiring more humectant.

Canister Tip Experiment at Point-of-Sale. Red oxide colorant compositions were loaded into point-of-sale manual carousel dispensers. PEG humectant and inventive Example 4 (14 phr of CTA) were added to the colorant compositions. One fluid ounce of colorant was dispensed after a predetermined time of inactivity as elapsed. After 48 hours of inactivity, the colorant composition with PEG humectant dried up and blocked the nozzle. After 48 hours of inactivity, the colorant composition with the inventive Example 4 remained fluid and did not dry, leading to an easy cleaning of the dispenser.

Color Transfer Experiment. Another set of experiments was conducted wherein the colorant compositions with the conventional PEG humectant and with the inventive hydrophobic oligomer were added to tint a commercial premium flat 3-base paint composition. Paint bases are discussed in commonly owned U.S. Pat. No. 9,994,722, which is incorporated herein by reference in its entirety. These experiments were conducted to compare the properties, such as color transfer and surfactant leaching, of the paint films.

Color transfer (or color rub-off) for paints tinted with colorants of red oxide were measured on 3-mil draw down dried for 7 days. This test involves the use of a water-damp piece of white felt which is weighted down and slid across a dried tinted paint film. The felt rubs off and picks up color from the film. This test shows how hydrophilic or hydrophobic a paint film is. Hydrophilic films would generally transfer more color than a hydrophobic film. The difference between a clean white felt to the colored felt was measured with a spectrophotometer and the measurements are ΔF or change in colors or a color difference in CIE2000 units with lower values being the better resistance to color transfer.

| Red oxide inorganic colorant composition - color transfer experiments | | | | | |
|---|---|---|---|---|---|
| conventional | Ex. 2 | Ex. 3 | Ex. 4 | Ex. 5 | Ex. 6 |
| 3.08 | 1.61 | 2.38 | 2.45 | 2.76 | 2.28 |

| Carbon black organic colorant composition - color transfer experiments | |
|---|---|
| conventional | Ex. 4 |
| 0.58 | 1.03 |

The results show that paints with colorants used with the inventive hydrophobic oligomer resist color rub-off better than or comparable to the paints with colorants used with conventional PEG humectant.

Surfactant Leaching Experiment. This test determines whether surfactants or other water-soluble materials can leach from a paint film to cause a blotchy appearance or tan or brown spots to appear on the paint film when certain environmental conditions exist. Surfactant leaching is a test for probing the extent of exterior water spotting on a coating. The test method for surfactant leaching involved forming 3-mil draw down panels of each coating composition. These panels were then allowed to dry in air at about 72° F. and 50% RH for about 24 hours. Each panel was then held so that the coating on the substrate was oriented vertically, at which point 3-5 drops of water were applied over the coated area. Additionally, water is also sprayed on the panel. Without changing the orientation of the panels, the coatings were allowed to dry for 1 day and 7 days. The presence or absence of visible staining on each panel was noted and rated from 1 to 5, with 1 representing the most visible stain and with 5 representing no visible stain, for drops and sprays at 1 day and at 7 days. The maximum rating is 20.

| Paints with inorganic red oxide colorant composition | | | | | |
|---|---|---|---|---|---|
| | Drops | | Spray | | |
| Humectant | 1 day | 7 days | 1 day | 7 days | Total |
| PEG | 3 | 3 | 2 | 3 | 11 |
| Example 2 | 3 | 4 | 2 | 4 | 13 |
| Example 3 | 2 | 4 | 4 | 3 | 13 |
| Example 4 | 2 | 4 | 4 | 4 | 14 |
| Example 5 | 2 | 3.5 | 3 | 3.5 | 12 |
| Example 6 | 2 | 3 | 2 | 3 | 10 |

| Paints with organic carbon black colorant composition | | | | | |
|---|---|---|---|---|---|
| | Drops | | Spray | | |
| Humectant | 1 day | 7 days | 1 day | 7 days | Total |
| PEG | 3 | 3 | 2 | 3 | 11 |
| Example 4 | 2 | 2 | 4 | 4 | 12 |

| Paints with organic phthalocyanine blue colorant composition | | | | | |
|---|---|---|---|---|---|
| | Drops | | Spray | | |
| Humectant | 1 day | 7 days | 1 day | 7 days | Total |
| PEG | 2 | 3 | 2 | 2 | 9 |
| Example 2 | 2 | 4 | 3 | 3 | 12 |
| Example 4 | 2 | 4 | 3 | 3 | 12 |

The results show that the surfactant leaching was comparable between the conventional PEG humectant and the inventive hydrophobic oligomer being used as a humectant. This shows that the inventive hydrophobic oligomer additive does not migrate to the surface of the paint film and does not contribute to the leaching.

In accordance with another aspect of the present invention, the inventive hydrophobic oligomer is added directly to the paint compositions as an open time (OT) extender additive. A 7-mil draw down of a primer paint was made over a scrub panel. The primer was slightly tinted to make the endpoint visible After allowing the panel to dry overnight a 3-mil draw down of a flat finish paint was made over the dried primer film. The open time was measured with the AB3600 dry time recorder. The recorder had three probes measuring at a time and multiple panels were run.

The Open Time Experiment. About 30 lbs. of the inventive hydrophobic oligomer was added to 100 gallons of paint, which was about 1.7 wt. % of the inventive hydrophobic oligomer solids to paint solids or about 10 solid lbs. of the inventive hydrophobic oligomer in 100 gallons of paint, which had about 52% solids. This ratio/percentage is also generally used for commercial open time additive, such as Wonderwet®. Preferably, as an open time agent the inventive hydrophobic oligomer is added from about 20 lbs. to about 80 lbs. per 100 gallons of paints, more preferably from about 30 lbs. to about 50 lbs. per 100 gallons. The preferred ratios for the open time experiment can be from about 1.13 wt. % to about 4.53 wt. % of the inventive hydrophobic oligomer solids to paint solids, preferably from about 1.7 wt. % to about 2.83 wt. % of the inventive hydrophobic oligomer solids to paint solids.

In the table below, paint samples without any OT additive, paint samples with Inventive Example 10 added and paint samples with a commercial OT additive (Wonderwet®).

| Sample | Control with no OT | With inventive hydrophobic oligomer | With commercial OT additive |
|---|---|---|---|
| Panel 1 | 10.18 | 12.32 | 10.63 |
| Open time (minutes) | 10.23 10.27 | 12.45 | 10.85 10.07 |
| Panel 2 | 10.22 | 10.88 | 9.68 |
| Open time (minutes) | 10.20 10.28 | 11.97 11.43 | 10.72 9.78 |
| Average | 10.23 | 11.81 | 10.85 |
| Deviation | 0.04 | 0.65 | 0.97 |

The paint with the inventive hydrophobic oligomer additive had one minute better open time than the paint with the commercial OT additive and 1.5 minutes better than the control paint.

Without being restricted to any particular theory, the present inventors believe that the anti-tip drying property and the improved OT property of the inventive non-film forming, low Tg, hydrophobic oligomer can be contributed to the fact that the inventive oligomer is not volatile and remains a liquid or in a flowing state within the relevant operating temperature ranges thereby keeping the colorant compositions softer longer to provide better dispensability and OT. The present inventors also believe that the hydrophobicity and low Tg contribute to the open time and improved tip dispensability by maintaining the inventive oligomer in a liquid or gel state. The present inventors also believe that the hydrophobic and fluidic properties of the inventive oligomer can control of leachable materials in the paint film, such as non-reactive surfactants.

Additional examples of the inventive hydrophobic oligomeric additive were prepared by utilizing a similar emulsion polymerization process described in connection with Examples 1-12, except as indicated otherwise.

| Example | Mw (Daltons) | Viscosity (Pa·s) | Tg (° C.) | CTA (iOMP) (phr) | Monomers wt. % |
|---|---|---|---|---|---|
| 1 | 2280 | 6.31 | −27 | 14 | MMA 15% BA 80% MAA 5% |
| 13 | 2202 | 3.8 | −29 | 14 | MMA 15.5% BA 80% AA 4.5% |
| 14 | 2023 | 1.88 | −45 | 14 | 2EHA 15.4% BA 80.1% AA 4.5% |
| 15 | 3002 | 1.61 | −45 | 10 | 2EHA 15.4% BA 80.1% AA 4.5% |
| 16 | 2871 | 6.34 | −42 | 10 | BA 92.5% AA 7.5% |
| 17 | 4607 | 19.37 | −45 | 5 | 2EHA 15.4% BA 80.1% AA 4.5% |
| 18 | 4610 | 15.85 | −47 | 5 | 2EHA 15.4% BA 82.4% AA 2.2% |

Examples 13-18 were conducted using less (meth)acrylate monomers (Example 13) or all acrylate monomers (Examples 14-18). Acrylic acid monomers were used instead of methacrylic acid monomers (Examples 13-18), and lesser amount of CTA was also tested (Examples 17-18). The oligomers in Examples 17-18 were in liquid state at room temperature (75° F.). A reduction of acrylic acid monomer also reduces viscosity (Example 17-18).

In Examples 1 and 13-18 shown in the Table above, the viscosity values were measured as an average of 20 measurements taken at a constant sheer rate with a Bohlin Rheometer in the sheer range of 5 s$^{-1}$ to 1,000 s$^{-1}$. The viscosity of Example 1 using the average of 20 measurements at a constant sheer (6.31 Pa·s) and the viscosity of Example 1 using the average of various different sheer rates (about 16 Pa·s in Examples 9 and 10 using the Anton Paar Modular Rheometer Model MCR 302) illustrates about a 9-10 Pa·s units or about 9.5 Pa·s units difference in the two systems of viscosity measurements.

The present inventors discovered that utilizing acrylic acid monomer instead of methacrylic acid monomer lowers the viscosity of the oligomer, as shown by Examples 1 and 13. Replacing the methacrylate monomers with acrylate monomers also reduces viscosity, as shown by Examples 1 and 14. Reducing the level of CTA also reduces viscosity, as shown by Examples 1 and 15, or does not affect viscosity significantly, as shown by Examples 14 and 15. Higher level of acrylic acid monomers tends to increase viscosity, as shown by Example 16.

Preferably, the level of viscosity should be low to assist with the flow of colorants through the colorant dispensers. The present inventors discovered from the Examples that the viscosity of the inventive polymeric additive is directly proportional to the Tg (calculated by the Flory Fox Equation) and is also directly proportional to the molecular weight (Mw). Viscosity is also directly proportional to the acid functionality (—COOH functionality). Hence, lower Mw lowers viscosity; lower acid level lowers viscosity; and lower Tg also lowers viscosity.

Furthermore, the polymeric additives that are polymerized mostly from acrylate monomers, or from substantially all or all acrylate monomers have lower Tg than the polymeric additives that are polymerized from a combination of methacrylate and acrylate monomers. Without being bound to any particular theory it is believed that methacrylate monomers formed more rigid polymers due to the restrictive rotation, and all/substantially all acrylate monomers are more mobile and formed more flexible monomers.

Based on Examples 1-18, the chain transfer agent can be present from about 4 phr to about 20 phr, or about 6 phr to about 17 phr, or from about 9 phr to about 15 phr or from about 5 phr to about 11 phr.

The range of viscosity of the inventive polymeric additive is preferably from about 1.0 Pa·s to about 20 Pa·s, or from about 3.0 Pa·s to about 16 Pa·s, or from about 5 Pa·s to about 12 Pa·s, when the viscosity values are averaged at the same sheer rate. The range of viscosity is preferably from about 14 Pa·s to about 36 Pa·s, and more preferably from about 15 Pa·s to about 20 Pa·s, where the viscosity values are averaged at various different sheer rates. It is noted that all viscosity measurements are made on inventive samples without water. The fluidity of inventive samples is also observed from inventive samples without water.

It is known that at least one acid monomer is generally polymerized along with the other monomers. In one embodiment, preferably acrylic acid monomer is utilized as the primary acid monomer, and more preferably as the only acid monomer. While the solubility of methacrylic acid monomer is about 89 g/l in water as discussed above, acrylic acid monomer is miscible with water, and has a water solubility of about 1,000 g/l. Replacing methacrylic acid monomer with acrylic acid monomer or utilizing only acrylic acid monomer renders the hydrophobic oligomeric additive more dispersible in water and less sticky.

The present inventors also experimented with utilizing the inventive hydrophobic oligomeric additive to the manufacturing of colorant compositions for commercialization. The optimal range of inventive hydrophobic oligomeric additive is from about 3 wt. % to about 8 wt. %, preferably from about 3.5 wt. % to about 7 wt. % and preferably from about 4 wt. % to about 6 wt. % or from about 3 wt. % to about 5 wt. %.

In another embodiment, the inventive hydrophobic oligomer additive was utilized in combination with a conventional hydrophilic humectant, such as polyethylene glycol or polypropylene glycol. The hydrophilic humectant is preferably added during the grind phase of dispersing the color pigments at a reduced level from about 1 wt. % to about 3 wt. %, and the inventive hydrophobic oligomeric additive is added during the letdown phase when the dispersed color pigments is diluted and blended with the inventive additive to make the colorant compositions. In this embodiment, the inventive hydrophobic oligomeric additive is added the range from about 0.1 wt. % to 4 wt. %, preferably from about 0.2 wt. % to about 3 wt. %, preferably from about 0.3 wt. % to about 2 wt. %.

As used herein, the weight percentages of the inventive hydrophobic oligomeric additive used in the colorant composition are calculated using the inventive hydrophobic oligomeric additive after polymerization including solids, water and other liquids, as shown for example in Example 1, and the colorant composition also includes solids, water and other liquids.

Examples 13, 14 and 15 were tested for stickiness using the zirconium bead test. In this test, thickener was added to these Examples to bring the viscosity to 80-95 Krebs Units (KU). 70 grams of the each of these Examples and 20 grams of Zirconox® (zirconium oxide) ceramic milling bead were added to a 100 ml plastic cup. The cups were placed on a mixer at 2,400 rpm for 10 minutes. The beads were filtered from the resin and thoroughly cleaned with deionized water and dried overnight at ambient conditions. The beads are then visually rated for clumping or sticking together. The visual results show that the inventive Examples 13, 14 and 15 do not clump the zirconium beads indicating that their low viscosity do not render the beads sticky, and that the inventive hydrophobic oligomeric additive would not stick to the surfaces of its storage units or conduits.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A colorant composition to tint a paint or stain composition comprising a pigment and an additive, wherein said additive is polymerized from at least one acrylate monomer and a chain transfer agent,
   wherein the additive has a weight average molecular weight (Mw) from about 2,000 Daltons to about 5,000 Daltons,
   wherein the chain transfer agent comprises a hydrogen-sulfur (H—S) functionality and is present from about 8 to about 20 parts per hundred parts of monomers (phr),
   wherein the additive's glass transition temperature ranges from about −50° C. to about −10° C.,
   wherein said additive is hydrophobic.

2. The colorant composition of claim 1, wherein the additive comprises from about 3 wt. % to about 8 wt. % of the colorant composition, and wherein in the determination of the weight percentages the additive and the colorant composition includes solids, water and liquids.

3. The colorant composition of claim 2, wherein the additive comprises from about 3.5 wt. % to about 7 wt. % of the colorant composition.

4. The colorant composition of claim 2, wherein the additive comprises from about 4.0 wt. % to about 6 wt. % of the colorant composition.

5. The colorant composition of claim 2, wherein the additive comprises from about 3 wt. % to about 5 wt. % of the colorant composition.

6. The colorant composition of claim 1 further comprising a hydrophilic humectant, wherein the additive comprises from about 0.1 wt. % to about 4 wt. % of the colorant composition, and wherein in the determination of the weight percentages the additive and the colorant composition includes solids, water and liquids.

7. The colorant composition of claim 6, wherein the additive comprises from about 0.2 wt. % to about 3 wt. % of the colorant composition.

8. The colorant composition of claim 7, wherein the additive comprises from about 0.3 wt. % to about 2.5 wt. % of the colorant composition.

9. An additive for a paint or stain composition or for a colorant composition, said additive is polymerized from at least one acrylate monomer and a chain transfer agent,
   wherein the additive has a weight average molecular weight (Mw) from about 2,000 Daltons to about 5,000 Daltons,
   wherein the chain transfer agent comprises a hydrogen-sulfur (H—S) functionality and is present from about 4 to about 20 parts per hundred parts of monomers (phr),
   wherein the additive's glass transition temperature ranges from about −50° C. to about −10° C.,
   wherein said additive is hydrophobic, and
   wherein said additive has a viscosity from about 1.0 Pa·s to about 20 Pa·s, when the viscosity values are averaged at the same sheer rate, or the viscosity is from about 14 Pa·s to about 36 Pa·s, when the viscosity values are averaged at various different sheer rates.

10. The additive of claim 9, wherein said additive is polymerized from at least 95 wt. % acrylate monomer or monomers.

11. The additive of claim 9, wherein said additive is polymerized with an acrylic acid monomer.

12. The additive of claim 9, wherein the at least one acrylate monomer is butyl acrylate (BA) or 2-ethylhexyl acrylate (2-EHA).

13. A colorant composition to tint a paint or stain composition comprising a pigment and the additive of claim 9.

14. A colorant composition comprising a color pigment and the additive of claim 9, wherein the additive is added to the colorant composition in a range from about 3 wt. % to about 8 wt. %, and
wherein in the determination of the weight percentages the additive and the colorant composition includes solids, water and liquids.

15. A colorant composition comprising a color pigment, a hydrophilic humectant and the additive of claim 9, wherein the additive is added to the colorant composition in a range from about 0.1 wt. % to about 4 wt. %,
wherein in the determination of the weight percentages the additive and the colorant composition includes solids, water and liquids.

16. The additive of claim 9, wherein the chain transfer agent is present from about 6 phr to about 17 phr.

17. The additive of claim 9, wherein the viscosity is from about 3.0 Pas to about 16 Pa·s, when the viscosity values are averaged at the same sheer rate.

18. The additive of claim 9, wherein the viscosity is from about 15 Pa·s to about 20 Pa·s, when the viscosity values are averaged at various different sheer rates.

19. The colorant composition of claim 14, wherein the additive is added to the colorant composition in a range from about 3.5 wt. % to about 7 wt. %.

20. The colorant composition of claim 14, wherein the additive is added to the colorant composition in a range from about 4 wt. % to about 6 wt. %.

21. The colorant composition of claim 14, wherein the additive is added to the colorant composition in a range from about 3 wt. % to about 5 wt. %.

22. The colorant composition of claim 15, wherein the additive is added to the colorant composition in a range from about 0.2 wt. % to about 3 wt. %.

23. The colorant composition of claim 15, wherein the additive is added to the colorant composition in a range from about 0.3 wt. % to about 2.5 wt. %.

24. The additive of claim 9, wherein the chain transfer agent is present from about 9 phr to about 15 phr.

25. The additive of claim 9, wherein the chain transfer agent is present from about 5 phr to about 11 phr.

26. The additive of claim 9, wherein the viscosity is from about 5 Pa·s to about 12 Pa·s.

* * * * *